United States Patent
Choi et al.

(10) Patent No.: US 12,390,758 B2
(45) Date of Patent: Aug. 19, 2025

(54) METHOD OF MANUFACTURING ZEOLITE-CARBON COMPOSITE AND METHOD OF TREATING EXHAUST GAS

(71) Applicant: SAMSUNG ELECTRONICS CO., LTD., Suwon-si (KR)

(72) Inventors: Woosung Choi, Suwon-si (KR); Ji Man Kim, Suwon-si (KR); Hyeonji Moon, Hwaseong-si (KR); Jin Seo Park, Suwon-si (KR); Zhengyang Li, Suwon-si (KR); Junho Chung, Suwon-si (KR); Joungwoo Han, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 406 days.

(21) Appl. No.: 18/086,302

(22) Filed: Dec. 21, 2022

(65) Prior Publication Data

US 2023/0356138 A1    Nov. 9, 2023

(30) Foreign Application Priority Data

May 6, 2022    (KR) .......................... 10-2022-0056060

(51) Int. Cl.
*B01D 53/02* (2006.01)
*B01D 53/04* (2006.01)
(Continued)

(52) U.S. Cl.
CPC ........ *B01D 53/0407* (2013.01); *B01J 20/165* (2013.01); *B01J 20/3078* (2013.01); *B01D 2253/102* (2013.01); *B01D 2253/108* (2013.01)

(58) Field of Classification Search
CPC ........ B01D 2253/102; B01D 2253/108; B01D 53/0407; B01J 20/165; B01J 20/20; B01J 20/3078
See application file for complete search history.

(56) References Cited

U.S. PATENT DOCUMENTS 4,784,672 A * 11/1988 Sircar ............... B01D 53/0462
95/143
4,886,769 A    12/1989 Kuma et al.
(Continued)

FOREIGN PATENT DOCUMENTS

CN    102942192 A    2/2013
CN    104028220 A    9/2014
(Continued)

OTHER PUBLICATIONS

Chang et al., "Adsorption and Desorption Characteristics of Semiconductor Volatile Organic Compounds on the Thermal Swing Honeycomb Zeolite Concentrator," Journal of the Air & Waste Management Association vol. 53, 2003—Issue 11 (8 Pages).
(Continued)

*Primary Examiner* — Christopher P Jones
(74) *Attorney, Agent, or Firm* — Sughrue Mion, PLLC

(57) ABSTRACT

Provided is a method of treating an exhaust gas including preparing a rotor provided with a zeolite-carbon composite therein, providing a mixed gas including an organic gas and an alkali gas in the rotor, adsorbing the organic gas and the alkali gas to the zeolite-carbon composite, and desorbing the organic gas and the alkali gas from the zeolite-carbon composite, and the zeolite-carbon composite includes a zeolite and a carbon layer on the zeolite.

14 Claims, 14 Drawing Sheets

(51) Int. Cl.
  *B01J 20/16* (2006.01)
  *B01J 20/30* (2006.01)

(56) References Cited

U.S. PATENT DOCUMENTS

| | | | | |
|---|---|---|---|---|
| 4,973,339 | A | * 11/1990 | Bansal | B01D 53/0476 |
| | | | | 96/115 |
| 5,194,414 | A | 3/1993 | Kuma | |
| 5,348,922 | A | 9/1994 | Kuma | |
| 5,779,767 | A | * 7/1998 | Golden | B01D 53/04 |
| | | | | 95/902 |
| 7,255,725 | B2 | 8/2007 | Chau et al. | |
| 2014/0033925 | A1 | * 2/2014 | Gueret | C09K 5/063 |
| | | | | 96/115 |
| 2016/0101407 | A1 | * 4/2016 | Wang | B01J 20/324 |
| | | | | 502/416 |
| 2021/0214224 | A1 | * 7/2021 | Wang | C01B 39/26 |

FOREIGN PATENT DOCUMENTS

| | | |
|---|---|---|
| CN | 112156757 A | 1/2021 |
| JP | 2002-316045 A | 10/2002 |
| JP | 2005-263521 A | 9/2005 |
| JP | 5487483 B2 | 5/2014 |
| JP | 6890947 B2 | 6/2021 |
| KR | 10-1752967 B1 | 7/2017 |
| KR | 10-2079913 B1 | 4/2020 |
| KR | 10-2021-0091545 A | 7/2021 |

OTHER PUBLICATIONS

Zhang et al., "Adsorptive and catalytic properties in the removal of volatile organic compounds over zeolite-based materials," Elsevier, Chinese Journal of Catalysis vol. 37, Issue 6, Jun. 2016, pp. 800-809 (10 total pages).

Yamauchi et al., "Performance of VOC Abatement by Thermal Swing Honeycomb Rotor Adsorbers," Ind. Eng. Chem. Res. 2007, 46, 4316-4322 (7 total pages).

Kodama et al., "Performance Evaluation for a Thermal Swing Honeycomb Rotor Adsorber Using a Humidity Chart," Journal of Chemical Engineering of Japan /vol. 28 (1995) Issue 1, (6 total pages).

Kodama et al., "Experimental Study of Optimal Operation for a Honeycomb Adsorber Operated with Thermal Swing, " Journal of Chemical Engineering of Japan, vol. 26, No. 5, 1993.

* cited by examiner

METHOD OF MANUFACTURING ZEOLITE-CARBON COMPOSITE AND METHOD OF TREATING EXHAUST GAS

CROSS-REFERENCE TO RELATED APPLICATIONS

This U.S. non-provisional patent application claims priority under 35 U.S.C. § 119 to Korean Patent Application No. 10-2022-0056060, filed on May 6, 2022, in the Korean Intellectual Property Office, the entire contents of which are hereby incorporated by reference.

BACKGROUND OF THE INVENTION

The inventive concept relates to a method of manufacturing a zeolite-carbon composite and a method of treating an exhaust gas using the zeolite-carbon composite.

An exhaust gas produced in industrial facilities such as various power plants or factories may contain chemical substances. The chemical substances contained in the exhaust gas has been identified as a cause of environmental pollution. Accordingly, research to reduce emission of the chemical substances in the exhaust gas has been actively conducted worldwide. However, because the exhaust gas includes several types of chemical substances, it was difficult to separate and remove different types of chemical substances.

SUMMARY

An embodiment of the inventive concept provides a method of manufacturing a zeolite-carbon composite having high adsorption capacity for different types of gases.

An embodiment of the inventive concept provides a method of treating an exhaust gas which is simplified and has an improved yield.

The inventive concept relates to a method of manufacturing a zeolite-carbon composite and a method of treating an exhaust gas. According to embodiments of inventive concept, a method of treating an exhaust gas may include providing a mixed gas including an organic gas and an alkali gas in a rotor provided with a zeolite-carbon composite therein, adsorbing the organic gas and the alkali gas to the zeolite-carbon composite, and desorbing the organic gas and the alkali gas from the zeolite-carbon composite, and the zeolite-carbon composite may include a zeolite and a carbon layer on the zeolite.

According to embodiments of inventive concept, a method of treating an exhaust gas may include providing a mixed gas including a hydrophobic gas and a hydrophilic gas in a rotor provided with a zeolite-carbon composite therein, adsorbing the hydrophobic gas and the hydrophilic gas to the zeolite-carbon composite under a first temperature condition, desorbing the hydrophobic gas and the hydrophilic gas from the zeolite-carbon composite under a second temperature condition and combusting the desorbed hydrophobic gas and the desorbed hydrophilic gas, the second temperature may be higher than the first temperature, and the zeolite-carbon composite may include a zeolite and a carbon layer on an outer surface of the zeolite.

According to embodiments of inventive concept, a method of manufacturing a zeolite-carbon composite according to an embodiment of the inventive concept may include preparing a mixture including a zeolite, an acid catalyst, and a saccharide and heat-treating the mixture to form a zeolite-carbon composite, and the zeolite-carbon composite may include the zeolite and a carbon layer on an outer surface of the zeolite.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Figure 1:
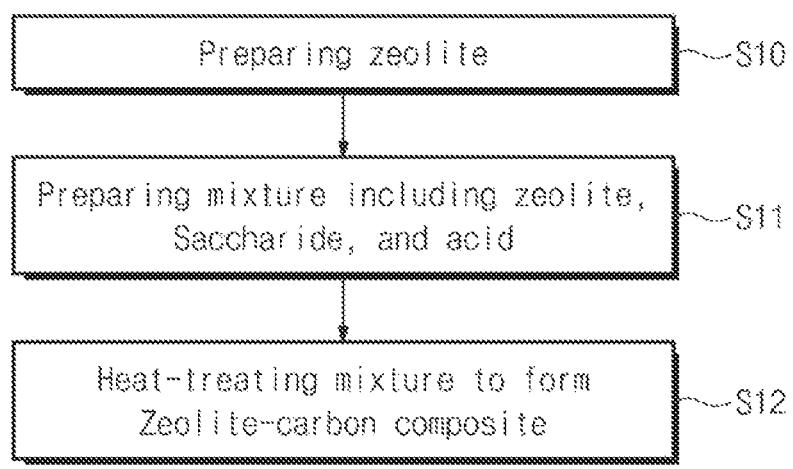
FIG. 1 is a flowchart for explaining a method of manufacturing a zeolite-carbon composite according to embodiments.

Although any methods and materials similar or equivalent to those described herein can be used in the practice or testing of embodiments described herein, some preferred methods, compositions, devices, and materials are described herein. However, before the present materials and methods are described, it is to be understood that this invention is not limited to the particular compositions, methodologies or protocols herein described, as these may vary in accordance with routine experimentation and optimization. It is also to be understood that the terminology used in the description is for the purpose of describing the particular versions or embodiments only, and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a", "an" and "the" include plural reference unless the context clearly dictates otherwise. Thus, for example, reference to "a zeolite" is a reference to one or more zeolites and equivalents thereof known to those skilled in the art, and so forth.

As used herein, the term "comprise" and linguistic variations thereof denote the presence of recited feature(s), element(s), method step(s), etc. without the exclusion of the presence of additional feature(s), element(s), method step(s), etc. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Herein, like reference numerals may refer to like elements throughout the drawings. Herein, a composite may include a zeolite-carbon composite.

The present disclosure provides a method of treating an exhaust gas, the method comprising providing a mixed gas including an organic gas and an alkali gas in a rotor provided with a zeolite-carbon composite there adsorbing the organic gas and the alkali gas to the zeolite-carbon composite, and desorbing the organic gas and the alkali gas from the zeolite-carbon composite, wherein the zeolite-carbon composite comprises a zeolite and a carbon layer on the zeolite. The method may further comprise preparing a rotor provided with a zeolite-carbon composite therein prior to the providing the mixed gas in the rotor. In one embodiment, the carbon layer may be hydrophobic, the alkali gas may be hydrophilic, and the organic gas may be hydrophobic. In another embodiment, the rotor play comprise a first region and a second region, and the adsorbing of the organic gas and the alkali gas may be performed in the first region of the rotor, while the desorbing, of the organic gas and the alkali gas may be performed in the second region of the rotor. In one embodiment, the second region of the rotor may be provided at a higher temperature than a temperature of the first region of the rotor. In some embodiment, the method may further comprise transferring the desorbed organic gas and the desorbed alkali gas to a combustion facility, and combusting the organic gas and the alkali gas in the combustion facility. In one embodiment, the providing of the mixed gas may comprise supplying a first gas through a first duct, and supplying a second gas through a second duct where the first gas comprises the organic gas, and the second gas comprises the alkali gas. In some embodiment, at least one of the first gas and the second gas may further comprise water vapor. In another embodiment, the second gas may further comprise the organic gas.

The present disclosure also provides a method of treating an exhaust gas, the method comprising providing a mixed gas including a hydrophobic gas and a hydrophilic gas in a rotor provided with a zeolite-carbon composite therein, adsorbing the hydrophobic gas and the hydrophilic gas to the zeolite-carbon composite under a first temperature, desorbing the hydrophobic gas and the hydrophilic gas from the zeolite-carbon composite under a second temperature, and combusting the desorbed hydrophobic gas and the desorbed hydrophilic gas, wherein the second temperature is higher than the first temperature, and the zeolite-carbon composite comprises a zeolite and a carbon layer on an outer surface of the zeolite. The method may further comprise preparing a rotor provided with a zeolite-carbon composite therein prior to the providing the mixed gas in the rotor. In one embodiment, the rotor may comprise a first region and a second region, wherein the adsorbing of the organic gas and the alkali gas may be performed in the first region of the rotor, and the desorbing of the organic gas and the alkali gas may be performed in the second region of the rotor. In another embodiment, the combusting of the hydrophobic gas and the hydrophilic gas may be performed in a combustion facility, and the second region of the rotor may be provided between the first region of the rotor and the combustion facility. In some embodiment, the providing of the mixed gas may comprise supplying the hydrophobic gas to a mixing chamber through a first duct; supplying the hydrophilic gas to the mixing chamber through a second duct, the mixed gas being formed in the mixing chamber; and transferring the mixed gas from the mixing chamber into the rotor, wherein the first region of the rotor may be provided between the mixing chamber and the second region of the rotor. In one embodiment, the zeolite may comprise a pore therein, wherein the carbon layer does not block the pore of the zeolite, and the pore of the zeolite is connected to an external space. In some embodiment, the hydrophobic gas may comprise isopropyl alcohol, and the hydrophilic gas comprises ammonia.

The present disclosure also provides a method of manufacturing a zeolite-carbon composite, the method comprising preparing a mixture including a zeolite, an acid catalyst, and a saccharide; and heat-treating the mixture to form a zeolite-carbon composite, wherein the zeolite-carbon composite comprises the zeolite and a carbon layer on an outer surface of the zeolite. In one embodiment, the zeolite may comprise silicon (Si) and aluminum (Al), and a molar ratio of the silicon to the aluminum may be 1 to 250 (or about 1 to about 250). In another embodiment, the zeolite-carbon composite has adsorption capacity for an organic gas and adsorption capacity for an alkali gas. In one embodiment, the heat-treating of the mixture may comprise carbonizing the saccharide to form the carbon layer. In some embodiment, the heat-treating of the mixture may be carried out at a temperature of 150° C. to 1000° C. (or about 150° C. to about 1000° C.). In another embodiment, the acid catalyst may be in an amount of 0.1 wt % to 100 wt % (or about 0.1 wt % to about 100 wt %) of the zeolite, and the acid catalyst may comprise at least one of a p-toluenesulfonic acid, an acetic acid, a hydrochloric acid, a nitric acid; a sulfuric acid, and a phosphoric acid.

For instance, the zeolite-carbon composite may be manufacture (as described below.

Figure 2A:
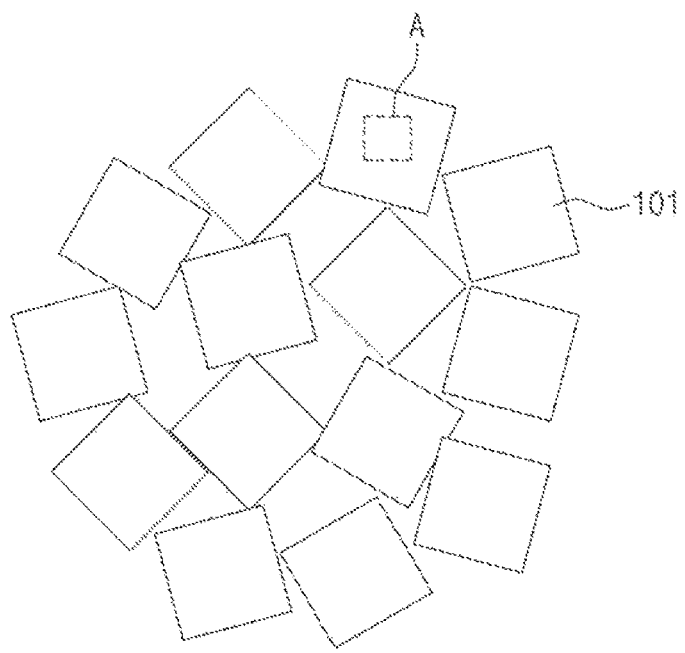
FIG. 2A is a schematic diagram illustrating zeolite particles.
Figure 2B:
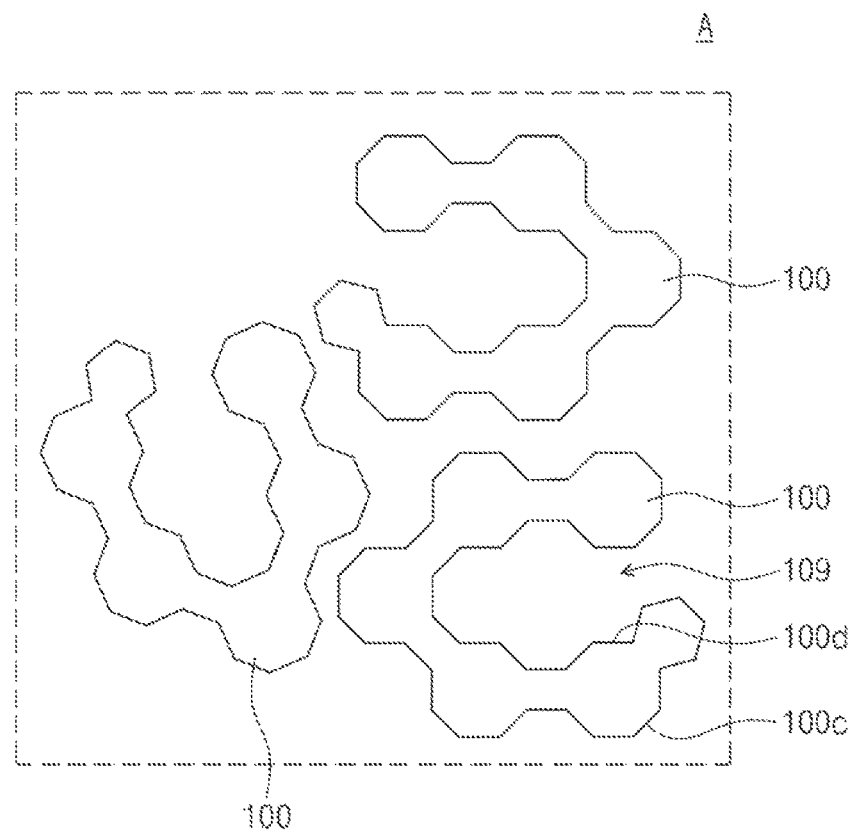
FIG. 2B is a view illustrating a zeolite according to embodiments, and corresponds to an enlarged view of part "A" of FIG. 2A.
Figure 2C:
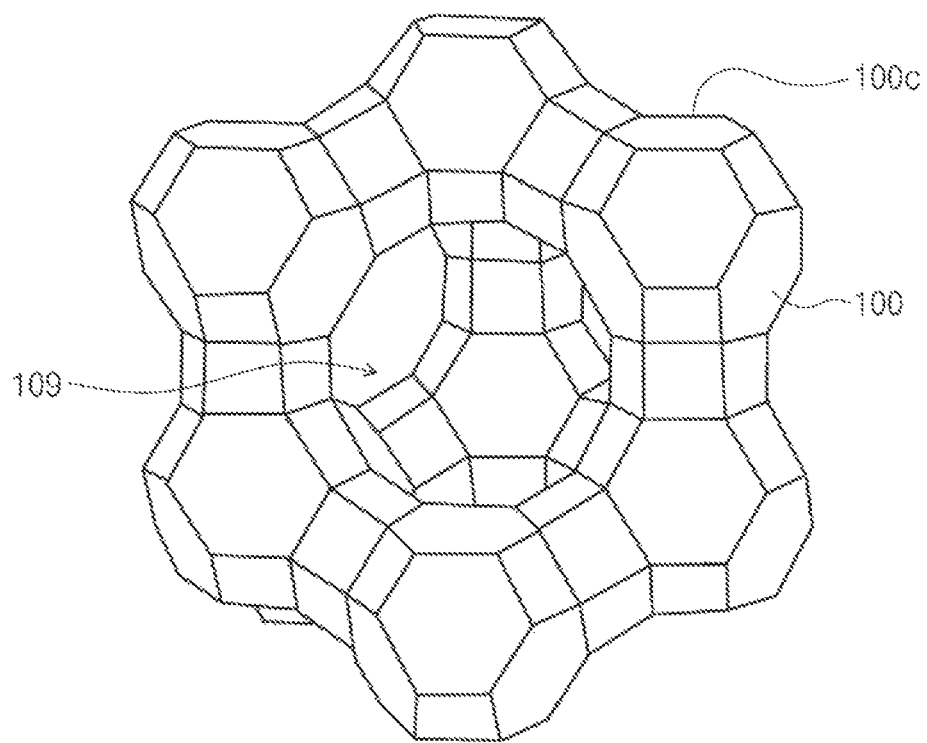
FIG. 2C is a view for explaining a crystal structure of a zeolite according to embodiments.
Figure 3:
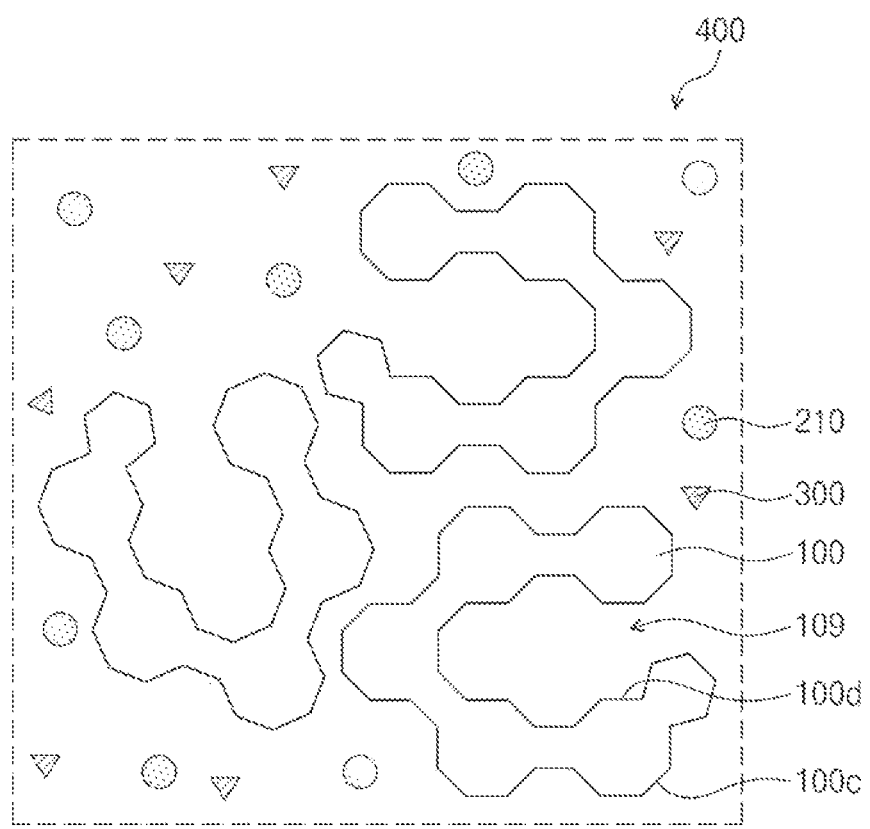
FIG. 3 is a view for explaining a preparation of a mixture according to the embodiments.
Figure 4A:
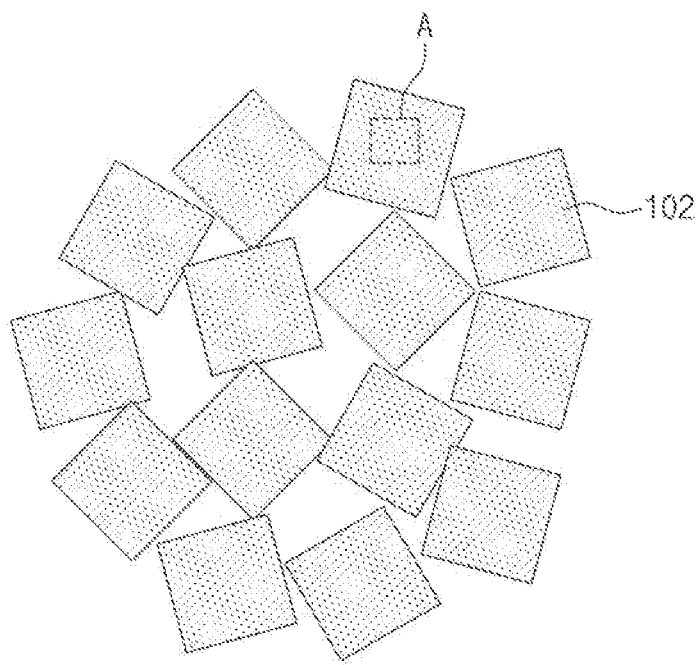
FIG. 4A is a schematic diagram illustrating composite particles according to embodiments.
Figure 4B:
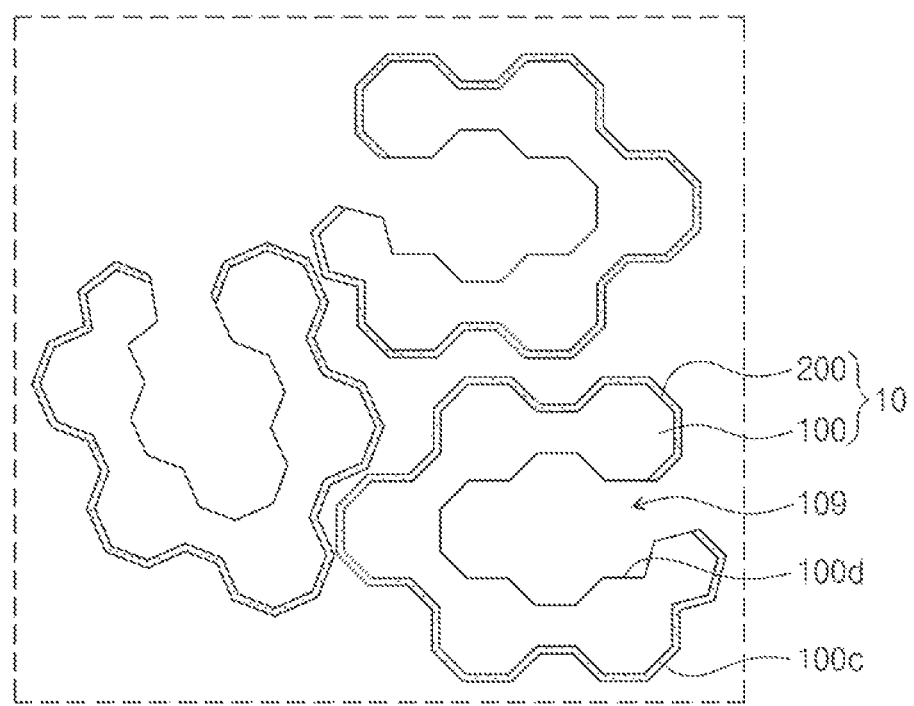
FIG. 4B is a view for explaining a zeolite-carbon composite according to embodiments, and corresponds to an enlarged view of part "A" of FIG. 4A.

FIG. 1 is a flowchart for explaining a method of manufacturing a zeolite-carbon composite according to embodiments. FIGS. 2A to 4B are views for explaining a method of manufacturing a zeolite-carbon composite. FIG. 2A is a schematic diagram illustrating zeolite particles. FIG. 2B is a view illustrating a zeolite according to embodiments, and is an enlarged view of part "A" of HG. FIG. 2C is a view for explaining a crystal structure of a zeolite according to embodiments. FIG. 3 is a view for explaining a preparation of a mixture according to embodiments, and corresponds to an enlarged view of part "A" of FIG. 2A. FIG. 4A is a schematic diagram illustrating composite particles according to embodiments. FIG. 4B is a view for explaining a zeolite-carbon composite according to embodiments, and is an enlarged view of part "A" of FIG. 4A.

Referring to FIGS. 1, 2A, 2B, and 2C, a zeolite 100 may be prepared in S10. The zeolite 100 may be provided in the plural. The zeolites 100 may form a zeolite particle 101 as illustrated in FIG. 2A, The zeolite particle 101 may be provided in the plural. Each of the zeolite particles 101 may include the plurality of zeolites 100. Hereinafter, a single zeolite 100 will be described for simplicity, but the inventive concept is not limited thereto.

The zeolite 100 according to embodiments may be hydrophilic. The zeolite 100 may include silicon (Si) and aluminum (Al). A molar ratio of silicon to aluminum in the zeolite 100 may be 1 to 250 (or about 1 to about 250). When the molar ratio of silicon to aluminum is less than 1, the zeolite 100 may not be formed. When the molar ratio of silicon to aluminum is greater than 250, it may be difficult for a zeolite-carbon composite 10 to be described later to easily adsorb an alkali gas (e.g., an ammonia gas). The zeolite 100 may have a three-dimensional crystal structure. The zeolite 100 may have a pore 109 therein. The pore 109 of the zeolite 100 may be connected to an external space. The zeolite 100 may have an inner surface 100d and an outer surface 100c that face each other. The pore 109 may expose the inner surface 100d of the zeolite 100.

The zeolite 100 may include a USY zeolite, ZSM zeolite (e.g., ZSM-5 zeolite), FAU zeolite, CHA zeolite, BEA zeolite, MOR zeolite, MFI zeolite, MWW zeolite, LTA zeolite, or a combination thereof. As an example, the zeolite 100 may have a structure as illustrated in FIG. 2C. However, the structure of the zeolite 100 is not limited to the example of FIG. 2C and may be variously modified.

A degassing process of the zeolite 100 may be further performed. The degassing process of the zeolite 100 may be performed in the zeolite 100 at 90° C. to 400° C. (or about 90° C. to about 400° C.). The degassing process may be performed under an inert gas condition. The inert gas may include nitrogen gas, helium gas, or argon gas. As another example, the degassing process may be performed in the atmosphere. When the degassing process is performed at less than 90° C., it may be difficult to remove an internal gas in the zeolite 100. The internal gas may include air, water vapor, or oxygen. According to embodiments, when the degassing process of the zeolite 100 is performed at a temperature condition of 90° C. or higher, the zeolite 100 may be degassed favorably. When the degassing process is performed at 400° C. or less, a crystal structure of the zeolite 100 may be favorably maintained during the degassing process.

Referring to FIGS. 1 and 3, a mixture 400 including the zeolite 100, a saccharide 210, and an acid 300 may be prepared in S11. For example, the saccharide 210 and the acid 300 may be added to the zeolite 100 to prepare the mixture 400. The mixture 400 may be in a liquid state. The saccharide 210 may include a monosaccharide, a disaccharide, an oligosaccharide, and a polysaccharide. For example, the saccharide 210 may include a disaccharide such as sucrose. As another example, the saccharide 210 may include lactose or maltose. The saccharide 210 may serve as a carbon source. The saccharide 210 may be 1 wt % to 500 wt % (or about 1 wt % to about 500 wt %) of the zeolites 100.

The acid 300 may be an acid catalyst. For example, the acid 300 may include a p-toluenesulfonic acid. As another example, the acid 300 may include an acetic acid, a hydrochloric acid, a nitric acid, a sulfuric acid, a phosphoric acid, or a mixture thereof. The acid 300 may be 0.1 wt % to 100 wt % (or about 0.1 wt % to about 100 wt %) of the zeolite 100.

The mixture 400 may be stirred, and the zeolite 100, the saccharide 210, and the acid 300 may be uniformly dispersed in the mixture 400.

A drying process of the mixture 400 may be further performed. The drying process may be performed under a condition of an inert gas such as argon gas, helium gas, or nitrogen gas. Alternatively, the drying process may be performed under the atmospheric condition. The drying process may be performed at a temperature condition of 90° C. to 400° C. (or about 0 CC to about 400° C.). When the drying process is performed at a temperature condition of 90° C. or higher, the zeolite 100 may be dried favorably. When the drying process is performed at 400° C. or less, the crystal structure of the zeolite 100 may be maintained during the drying process.

Referring to FIGS. 1, 4A, and 4B, the mixture 400 may be heat-treated to form a zeolite-carbon composite 10 in S12. The heat treatment of the mixture 400 may include a carbonization process. For example, the saccharide 210 may be carbonized to form a carbon layer 200 as illustrated in FIG. 4B. The carbon layer 200 may be formed on the outer surface 100c of the zeolite 100. In the carbonization process, the acid 301) may act as a catalyst, and thus the saccharide 210 may be favorably carbonized. The carbon layer 200 may conformally cover the outer surface 100c of the zeolite 100. For example, a thickness of the carbon layer 200 on the outer surface 100c of the zeolite 100 may be relatively uniform. The carbon layer 200 may not block the pore 109 in the zeolite 100. For example, the carbon layer 200 may not cover the inner surface 100d of the zeolite 100. Accordingly, the specific surface area of the zeolite-carbon composite 10 may not be reduced. As another example, the carbon layer 200 may cover at least a portion of the inner surface 100d of the zeolite 100. Accordingly, composites may be prepared. The composites may be zeolite-carbon composites 10.

The heat treatment may be performed at a temperature condition of 150° C. to 1000° C. (or about 150° C. to about 1000° C.), When the heat treatment is performed at a temperature lower than 150° C., it may be difficult for the saccharide 210 to be carbonized. When the heat treatment is performed at a temperature of 1000° C. or less, the structure of the zeolite 100 may be maintained. The heat treatment process may be performed for about 1 hour to 5 hours, but the inventive concept is not limited thereto.

When the acid 300 described in FIG. 3B is less than 0.1 wt % of the zeolite 100, the carbon layer 200 may non-uniformly cover the outer surface 100c of the zeolite 100. According to embodiments, when the acid 300 is 0.1 wt % or more of the zeolite 100, the carbon layer 200 may uniformly cover the outer surface 100c of the zeolite 100. When the acid 300 is 100% or less of the zeolite 100, decomposition of the saccharide 210 or the zeolite 100 during the carbonization process may be prevented or reduced.

The zeolite-carbon composite 10 may be one of a plurality of zeolite-carbon composites 10. A plurality of zeolite-carbon composites 10 may constitute a composite particle 102 as illustrated in FIG. 4A. The composite particle 102 may be formed from the zeolite particle 101 described with reference to FIG. 2A. The composite particle 102 may be provided in the plural. Preparation of the zeolite-carbon composites 10 may be completed according to a production example described above.

Each of the zeolite-carbon composites 10 may have an adsorption capacity for an organic gas and an adsorption capacity for an alkali gas. The organic gas may be a hydrophobic gas. The alkali gas may be hydrophilic.

In addition, for instance, a method of treating an exhaust gas using zeolite-carbon composites according to embodiments is performed as described below.

Figure 5:
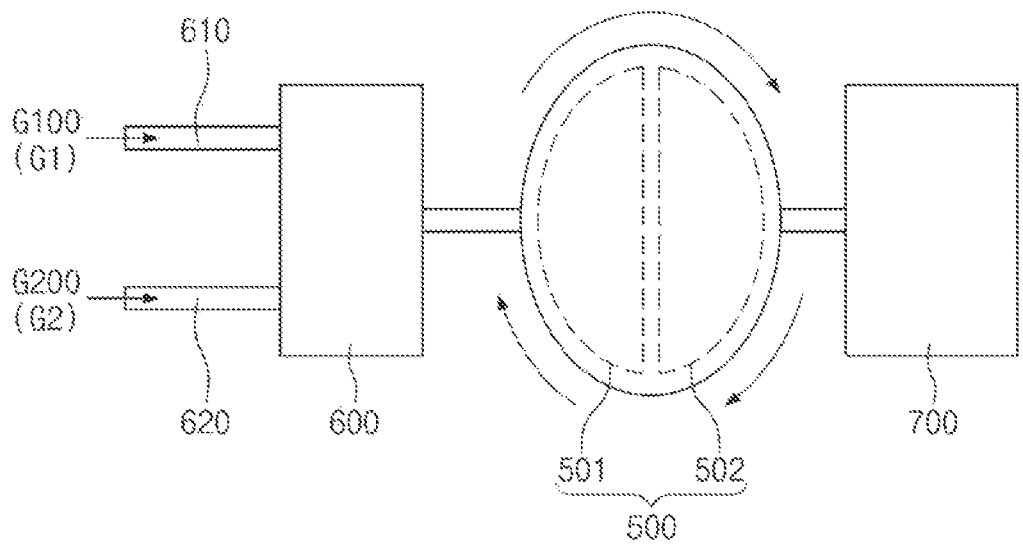
FIG. 5 is a view for explaining an exhaust gas treatment system according to embodiments.
Figure 6:
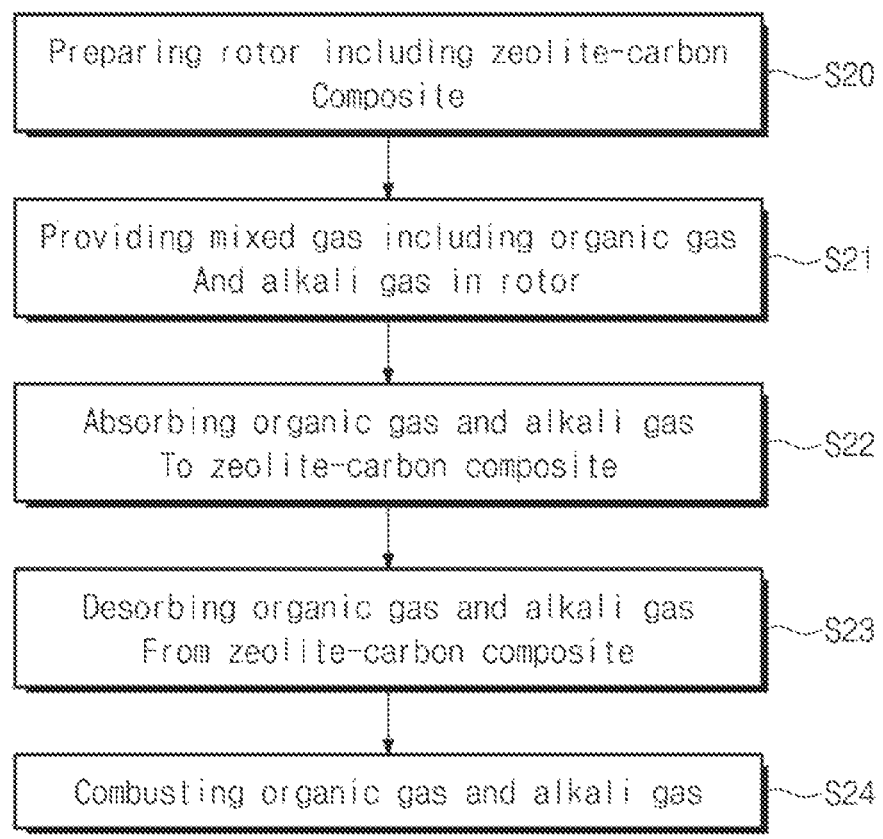
FIG. 6 is a flowchart illustrating a method of treating an exhaust gas according to embodiments.

FIG. 5 is a view for explaining an exhaust gas treatment system according to embodiments. FIG. 6 is a flowchart illustrating a method of treating an exhaust gas according to embodiments. FIGS. 7A to 7E are views for explaining a method of treating an exhaust gas according to embodiments.

Figure 7A:
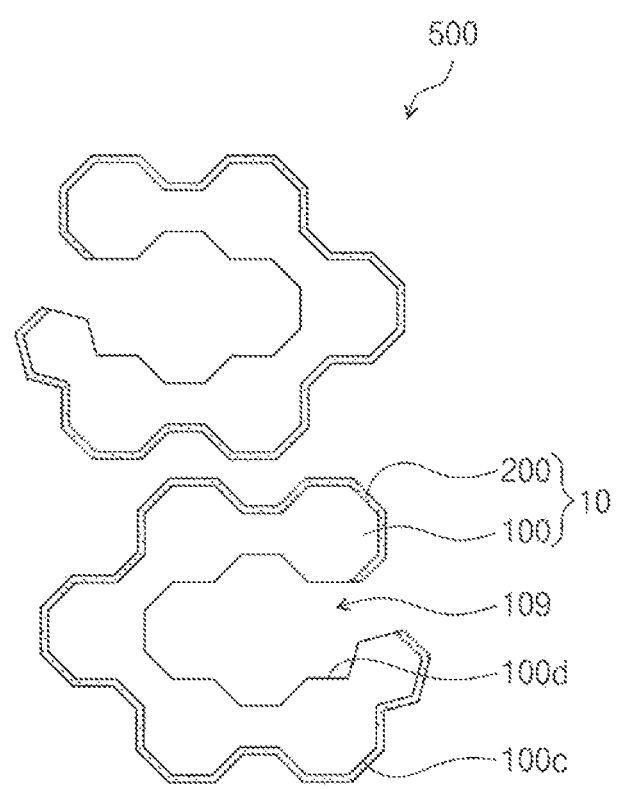
FIGS. 7A to 7E are views for explaining a method of treating an exhaust gas according to embodiments.

Referring to FIGS. 5, 6, and 7A, an exhaust gas treatment system may be provided. An exhaust gas may include an organic gas G1 and an alkali gas G2. The exhaust gas treatment system may include a first duct 610, a second duct 620, a mixing chamber 600, a rotor 500, and a combustion facility 700. A first end of the first duct 610 and a first end of the second duct 620 may be connected to the mixing chamber 600. A second end of the first duct 610 may be connected to an apparatus for manufacturing a semiconductor device. A second end of the second duct 620 may be connected to an apparatus for manufacturing a semiconductor device. The apparatus for manufacturing a semiconductor device connected to the first duct 610 may be the same as or different from the apparatus for manufacturing a semiconductor device connected to the second duct 620. The organic gas G1 and the alkali gas G2 may be generated in a process for manufacturing a semiconductor device. A first gas G100 may be supplied to the mixing chamber 600 through the first duct 610. The first gas G100 may include the organic gas G1. The organic gas G1 may include volatile organic compounds (VOC). The organic gas G1 may be a hydrophobic gas. For example, the organic gas G1 may include isopropyl alcohol (IPA). The first gas G100 may further include water vapor. The first gas G100 may further include an alkali gas as an impurity. In this case, a concentration of the organic gas G1 in the first gas G100 may be greater than a concentration of the alkali gas in the first gas G100.

A second gas G200 may be supplied to the mixing chamber 600 through the second duct 620, The second gas G200 may include a different type of gas from the first gas G100. The second gas G200 may include an alkali gas G2. The alkali gas G2 may be a hydrophilic gas. The alkali gas G2 may include an ammonia gas. The second gas G200 may further include water vapor. The second gas G200 may further include an organic gas as an impurity. In this case, a concentration of the alkali gas G2 in the second gas G200 may be greater than a concentration of the alkali gas in the second gas G200.

Figure 7B:
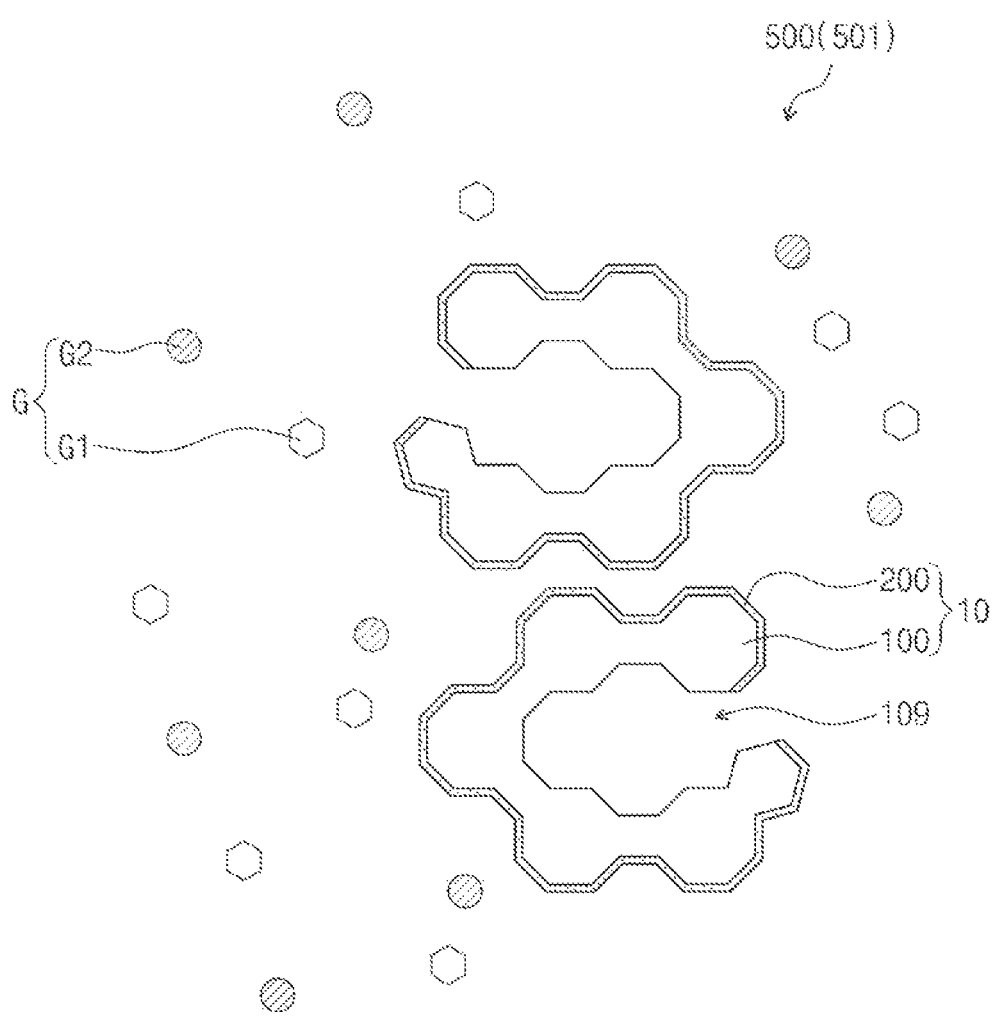

A mixed gas G by supplying the first gas G100 and the second gas G200 as illustrated in FIG. 7B may be formed in the mixing chamber 600, The mixed gas G may be a mixed gas of the first gas G100 and the second gas G200. In detail, the mixed gas 6 may include the organic gas G1 and the alkali gas G2. The mixed gas G may further include water vapor.

The rotor 500 including the zeolite-carbon composites 10 may be prepared in S20. The zeolite-carbon composites 10 may be provided inside the rotor 500. In detail, the rotor 500 may include the composite particles 102 described with reference to FIG. 4A, and each of the composite particles 102 may include the zeolite-carbon composites 10 as illustrated in FIG. 7A.

The rotor 500 may be provided on one side of the mixing chamber 600 and may be connected to the mixing chamber 600, The rotor 500 may include a first region 501 and a second region 502. The zeolite-carbon composites 10 may be provided in the first region 501 and the second region 502 of the rotor 500, The first region 501 of the rotor 500 may be a region adjacent to the mixing chamber 600. The first region 501 of the rotor 500 may be provided between the second region 502 and the mixing chamber 600. The first region 501 of the rotor 500 may be provided at, for example, a first temperature condition. The first temperature condition may be 10° C. to 100° C. (or about 10° C. to about 100° C.).

Referring to FIGS. 5, 6, and 7B, the mixed gas may be provided in the rotor 500 from the mixing chamber 600 in S21. For example, the mixed gas G may move from the mixing chamber 600 into the rotor 500.

Unlike that illustrated in FIG. 5, the exhaust gas treatment system may not include the mixing chamber 600. The first duct 610 and the second duct 620 may be directly connected to the rotor 500. The first gas G100 may be supplied to the rotor 500 through the first duct 610, and the second gas G200 may be supplied to the rotor 500 through the second duct 620. In this case, providing the mixed gas G may include supplying the first gas G100 and the second gas G200 into the rotor 500 to form the mixed gas G.

Figure 7C:
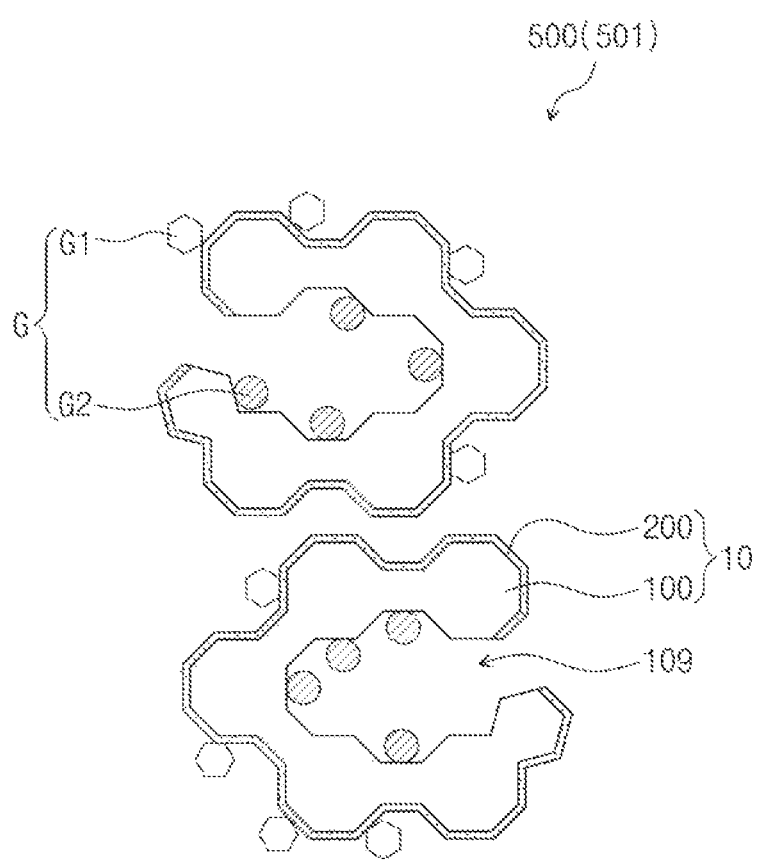

Referring to FIGS. 5, 6, and 7C, the organic gas G1 and the alkali gas G2 may be adsorbed to the zeolite-carbon composites 10 in S22. The adsorption of the organic gas G1 and the alkali gas G2 may be performed in the first region 501 of the rotor 500.

The organic gas G1 may be hydrophobic. The zeolite-carbon composites 10 may have high adsorption capacity for the organic gas G1 because the carbon layer 200 is hydrophobic. For example, the organic gas G1 may be adsorbed to the carbon layer 200. Herein, adsorption capacity for the organic gas may be adsorption capacity for the organic gas G1.

The alkali gas G2 may be hydrophilic. The zeolite-carbon composites 10 may have high adsorption capacity for the alkali gas G2 because the zeolite 100 according to the embodiments is hydrophilic. For example, the alkali gas G2 may be adsorbed to the zeolite 100. Alternatively, the alkali gas G2 may be adsorbed to the carbon layer 200. Hereinafter, adsorption capacity for the alkali gas may be adsorption capacity for the alkali gas G2.

When the carbon layer 200 is omitted, the hydrophobic gas may have a low adsorption for the zeolite 100. When the exhaust gas is treated using the zeolite 100, it may be difficult for the hydrophobic gas to be adsorbed to the zeolite 100, For example, the organic gas G1 may be difficult to adsorb to the zeolite 100. In this case, after the organic gas G1 and the alkali gas G2 are separated from each other, a process of treating the organic gas G1 may be performed by a process separate from a process treating of the alkali gas G2. Accordingly, the treating of the exhaust gas may be complicated, and the exhaust gas treatment system may have a large size. In this case, when the first gas G100 of FIG. 5 includes the alkali gas G2 as an impurity, it may be difficult to remove the alkali gas G2 in the process of treating the first gas G100. When the second gas G200 of FIG. 5 includes the organic gas G1 as an impurity, it may be difficult to remove the organic gas G1 in the process of treating the second gas G200.

According to embodiments, the zeolite-carbon composites 10 may have the adsorption capacity for the organic gas and the adsorption capacity for alkali gas, and thus one type of zeolite-carbon composites 10 may be used to treat the organic gas G1 and the alkali gas G2. For example, the organic gas G1 and the alkali gas G2 may be adsorbed onto the zeolite-carbon composites 10 substantially simultaneously in a single process. Accordingly, the process of treating the exhaust gas may be simplified. The organic gas G1 and the alkali gas G2 may be treated in a single exhaust gas treatment system. For example, an adsorption process of the organic gas G1 and an adsorption process of the alkali gas G2 may be performed in the single rotor 500. Accordingly, the exhaust gas treatment system may be downsized.

According to the embodiments, although the first gas G100 supplied from the first duct 610 of FIG. 5 contains the alkali gas as an impurity, the treating of the organic gas G1 and the alkali gas G2 may be performed in a single process, and thus the impurity (e.g., alkali gas) in the first gas G100 may be favorably removed. Likewise, although the second gas G200 of FIG. 5 includes the organic gas as an impurity, the impurity (e.g., organic gas) in the second gas G200 may be favorably removed by the zeolite-carbon composites 10. A removal yield of the exhaust gas may be improved.

According to embodiments, although the mixed gas G of FIG. 7B further includes water vapor, the zeolite-carbon composites 10 may have high adsorption capacity for the organic gas and high adsorption capacity for the alkali gas. That is, the zeolite-carbon composites 10 may have improved the adsorption capacity for the organic gas and the adsorption capacity for the alkali gas under a high humidity condition.

The adsorption capacity for the organic gas and the adsorption capacity for the alkali gas may have a trade-off relationship with each other. According to embodiments, a thickness, the area, and weight of the carbon layer 200 may be adjusted. For example, as described in the example of FIGS. 3A and 3B, the saccharide 210 in the mixture 400 may be from 1 wt % to 500 wt (or from about 1 wt % to about 500 wt of the zeolite 100, and the acid 300 may be 0.1 wt % to 100 wt % of the zeolite 100. Accordingly, the carbon layer 200 may cover the outer surface 100c of the zeolite 100, but may not block the pore 109 of the zeolite 100. The zeolite-carbon composites 10 prepared according to the embodiments may have the high adsorption capacity for the organic gas and the high adsorption capacity for the alkali gas.

The carbonization process temperature described in the example of FIGS. 4A and 4B may be adjusted, and thus the carbon layer 200 may have a loose packing structure. Accordingly, ammonia adsorption capacity of the zeolite-carbon composite 10 may be increased. When the carbonization process temperature is higher than 1000° C., the carbon layer 200 may have an excessively rigid packing structure. In this case, the adsorption capacity of the zeolite-carbon composite 10 may be reduced. According to embodiments, the carbonization process may be performed under a temperature condition of 150° C. to 1000° C. (or about 150° C. to about 1000° C.) to form the zeolite-carbon composites 10. The zeolite-carbon composites 10 may have improved adsorption capacity for the organic gas and adsorption capacity for the alkali gas.

Figure 7D:
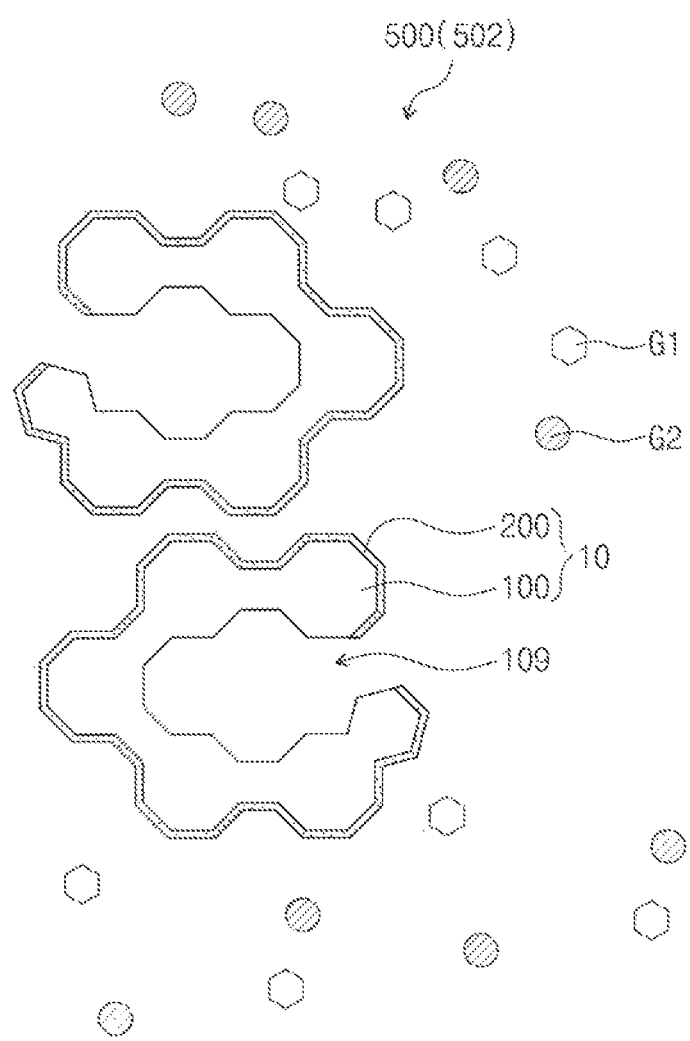

Referring to FIGS. 5, 6, and 7D, the zeolite-carbon composites 10 of the first region 501 of the rotor 500 may move to the second region 502 of the rotor 500 by rotation of the rotor 500. Accordingly, the zeolite-carbon composites 10 to which the organic gas G1 and the alkali gas G2 are adsorbed may be provided in the second region 502 of the rotor 500. The second region 502 of the rotor 500 may be adjacent the combustion facility 700. For example, the second region 502 of the rotor 500 may be provided between the first region 501 of the rotor 500 and the combustion facility 700. The second region 502 of the rotor 500 may be provided at a second temperature condition higher than the first temperature of the rotor 500. For example, the second temperature condition may be approximately 150° C. to 350° C. (or about 1.50° C. to about 350° C.).

In the second temperature condition, the organic gas G1 and the alkali gas G2 may be desorbed from the zeolite-carbon composites 10 in S23. When the second region 502 of the rotor 500 is lower than 1.50° C., it may be difficult for the organic gas G1 or the alkali gas G2 to be desorbed from the zeolite-carbon composites 10. When the second region 502 of the rotor 500 is higher than 350° C., the zeolite 100 may be damaged. According to embodiments, the desorption process may be performed at 150° C. to 350° C. (or about 150° C. to about 350° C.), and thus the organic gas G1 and the alkali gas G2 may be favorably desorbed from the zeolite-carbon composites 10. The zeolite-carbon composites 10 according to the embodiments may have, thermal stability at the second temperature. Accordingly, during the desorption process, the zeolite-carbon composites 10 may not be damaged.

Figure 7E:
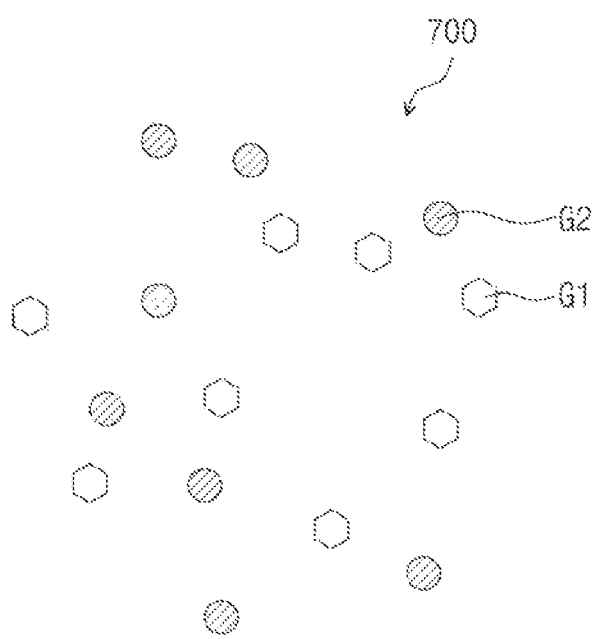

Referring to FIGS. 5, 6, and 7E, the desorbed organic gas G1 and alkali gas G2 may move from the second region 502 of the rotor 500 to the combustion facility 700.

The organic gas G1 and the alkali gas G2 may be combusted in the combustion facility 700 in S24. Accordingly, the organic gas G1 and the alkali gas G2 may be removed.

Referring back to FIGS. 6 and 7A, after the desorption process, the zeolite-carbon composites 10 desorbed may move from the second region 502 of the rotor 500 to the first region 501 of the rotor 500 by the rotation of the rotor 500. The adsorption process and the desorption process may be repeatedly performed using the zeolite-carbon composites 10. The zeolite-carbon composites 10 may be reused in the adsorption process and the desorption process, thereby simplifying the process.

[Preparation of Zeolite-Carbon Composite]

1. Comparative Examples (1) Comparative Example 1

USY zeolite was prepared. Here, a Si/Al molar ratio in the zeolite is 30.

(2) Comparative Example 2

ZSM-5 zeolite was prepared. Here, a Si/Al molar ratio in the zeolite is 50.

2. Experimental Examples

Zeolite-carbon composites according to Comparative Examples 3 and 4, and Experimental Examples were prepared under conditions as illustrated in Table 1 below.

First, a USY zeolite was prepared. Here, a Si/Al molar ratio in the zeolite is illustrated in Table 1 below. 10 g of zeolite was dried in an oven at 120° C. for 12 hours to perform a degassing process of the zeolite. An aqueous solution in which a sucrose and a p-toluenesulfonic acid were dissolved in the degassed zeolite was added to prepare a mixture. The mixture was stirred at 25° C. at a speed of 2000 rpm for 10 minutes to disperse the sucrose, the p-toluenesulfonic acid, and the zeolite. The mixture was dried in an oven at 120° C. for 12 hours to remove moisture in the zeolite. Under atmospheric conditions, the mixture was calcined for 2 hours at an elevated temperature of 2° C./min to perform a carbonization process. Accordingly, zeolite-carbon composites such as Experimental Example 1-5, Experimental Example 1-10, Experimental Example 1-25, Experimental Example 1-50, and Experimental Example 1-100, Experimental Example 2-300, Experimental Example 2-500, Experimental Example 2-700, and Experimental Example 2-900 were prepared.

TABLE 1

| | Si/Al molar ratio in zeolite | Weight of zeolite:weight of sucrose | Weight percent of sucrose to zeolite (wt %) | Weight of zeolite:weight of p-toluenesulfonic acid | Carbonization process temperature (° C.) |
|---|---|---|---|---|---|
| Experimental Example 1-5 | 30 | 1:0.05 | 5 | 1:0.065 | 900 |
| Experimental Example 1-10 | | 1:0.1 | 10 | 1:0.13 | |
| Experimental Example 1-25 | | 1:0.25 | 25 | 1:0.325 | |
| Experimental Example 1-50 | | 1:0.5 | 50 | 1:0.65 | |
| Experimental Example 1-100 | | 1:1 | 100 | 1:1.3 | |
| Experimental Example 2-300 | | 1:0.75 | 75 | 1:0.975 | 300 |
| Experimental Example 2-500 | | | | | 500 |
| Experimental Example 2-700 | | | | | 700 |
| Experimental Example 2-900 | | | | | 900 |
| Comparative Example 3 | | | | | 1100 |
| Comparative Example 4 | | 1:0 | 0 | 0 | 900 |

[Evaluation of Characteristics of Zeolite-Carbon Composite]

1. X-Ray Diffraction Analysis

Figure 8:
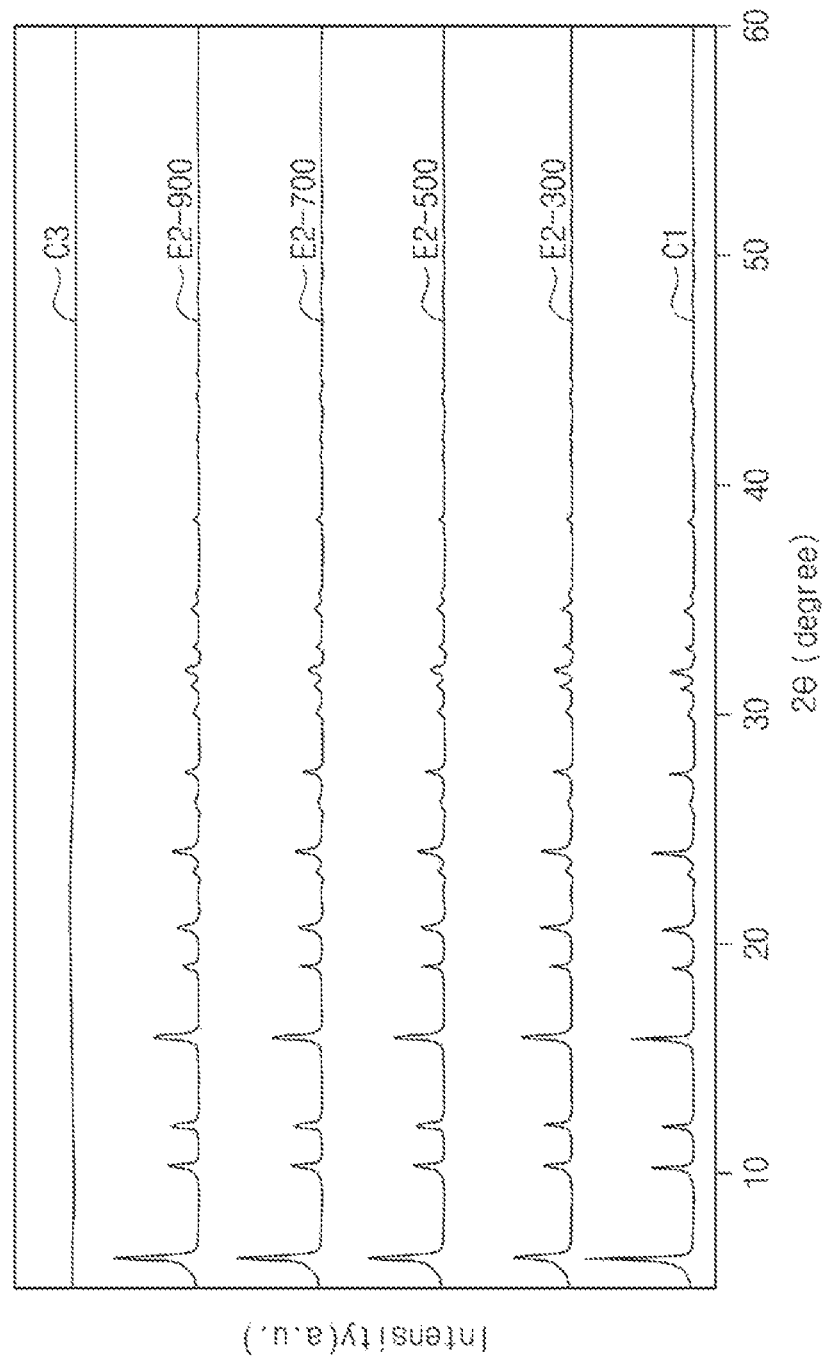
FIG. 8 shows X-ray diffraction (XRD) analysis results of Comparative Examples and Experimental Examples.

FIG. 8 is X-ray diffraction (XRD) analysis results of Comparative Example 1, Comparative Example 3, Experimental Example 2-300, Experimental Example 2-500, Experimental Example 2-700, and Experimental Example 2-900, Referring to FIG. 8, the zeolite of Comparative Example 1 (C1) has a crystal structure. Experimental Example 2-300 (E2-300), Experimental Example 2-500 (E2-500), Experimental Example 2-700 (E2-700), and Experimental Example 2-900 (E2-900) are carried out at 300° C., 500° C., 700° C., and 900° C., respectively. The zeolite-carbon composites of Experimental Example 2-300 (E2-300), Experimental Example 2-500 (E2-500), Experimental Example 2-700 (E2-700), and Experimental Example 2-900 (E2-900) have a crystal structure, respectively.

Comparative Example 3 (C3) do not have a crystal structure. In the case of Comparative Example 3 (C3), the carbonization process is performed at 1100° C., and the crystal structure of the zeolite may be damaged.

According to embodiments, the carbonization process is performed at 150° C. to 1000° C., the crystal structure of the zeolite may be maintained although the carbon layer is formed.

2. Thermogravimetric Analysis

Figure 9A:
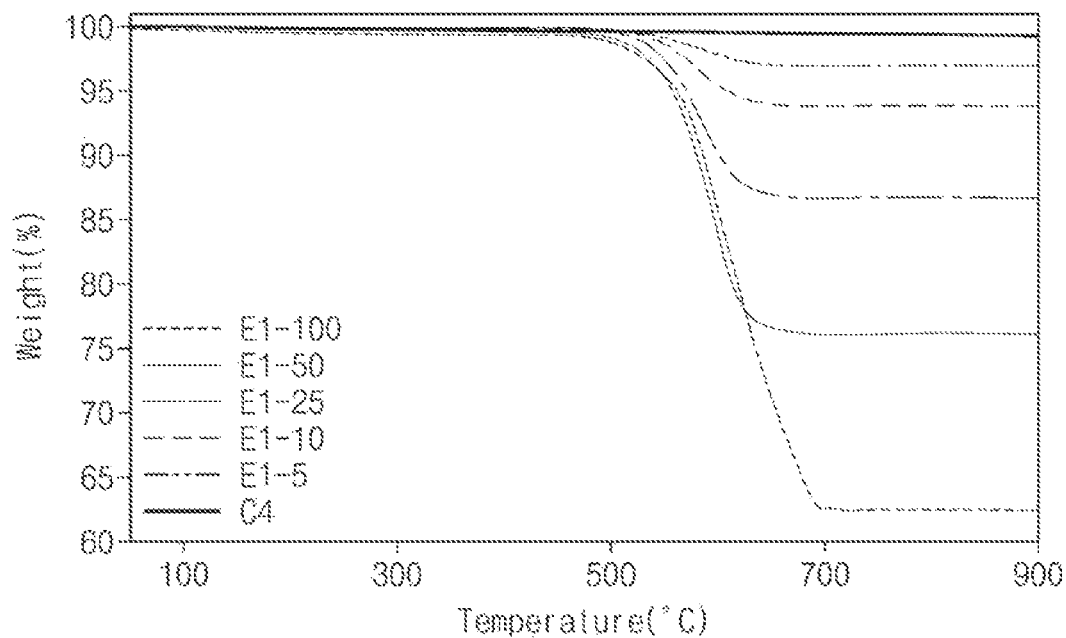
FIG. 9A is a graph illustrating thermogravimetric analysis (TGA) results of Comparative Examples and Experimental Examples.
Figure 9B:
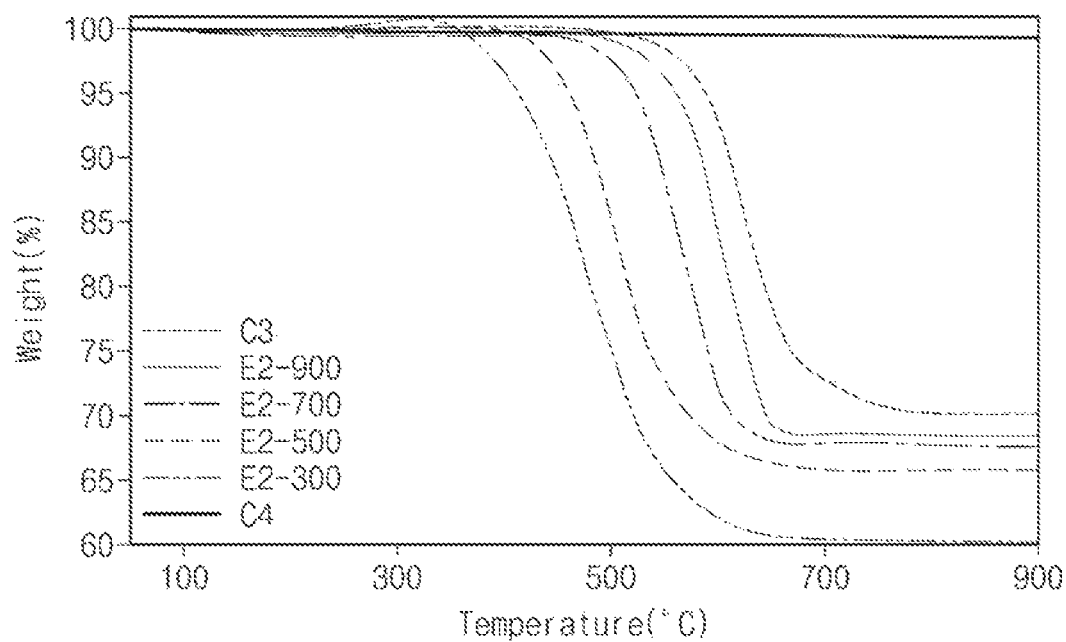
FIG. 9B is a graph illustrating thermogravimetric analysis (TGA) results of Comparative Examples and Experimental Examples.

FIG. 9A is a graph illustrating thermogravimetric analysis (TGA) results of Comparative Example 4, Experimental Example 1-5, Experimental Example 1-10, Experimental Example 1-25, Experimental Example 1-50, and Experiment 1-100. FIG. 9B is a graph illustrating thermogravimetric analysis (TGA) results of Comparative Example 3, Comparative Example 4, Experimental Example 2-300, Experimental Example 2-500, Experimental Example 2-700, and Experimental Example 2-900. The thermogravimetric analysis is evaluated by measuring a change in weight depending on temperature. In FIGS. 9A and 9B, a horizontal axis is temperature, and a vertical axis is a weight of the remaining zeolite-carbon composite relative to a weight of an original zeolite-carbon composite.

Referring to FIG. 9A, although the temperature is increased up to 400° C. or less, the weights of Comparative Example 4 (C4), Experimental Example 1-5 (E1-5), Experimental Example 1-10 (E1-10), Experimental Example 1—The weights of 25 (E1-25), Experimental Example 1-50 (E1-50), and Experimental 1-100 (E1-100) are kept unchanged. It may be seen that the zeolite-carbon composites of Experimental Example 1-5 (E1-5), Experimental Example 1-10 (E1-10), Experimental Example (E1-25), Experimental Example 1-50 (E1-50), and Experimental 1-100 (E1-100) have thermal stability at the temperature condition of 400° C. or less.

Referring to FIG. 9B, although the temperature is increased up to 400° C. or less, the weights of Comparative Example 3 (C3), Comparative Example 4 (C4), Experimental Example 2-300 (E2-300), Experimental Example 2-500 (E2-500), Experimental Example 2-700 (E2-700), and Experimental Example 2-900 (E2-900) are kept unchanged. It may be seen that the zeolite-carbon composites of Experimental Example 2-300 (E2-300), Experimental Example 2-500 (E2-500), Experimental Example 2-700 (E2-700), and Experimental Example 2-900 (E2-900) have thermal stability at the temperature condition of 400° C. or less.

According to embodiments, adsorbing the organic gas and the alkali gas to the zeolite-carbon composites in S22 described in FIGS. 4, 5, and 7C and desorbing the organic gas and the alkali gas from the zeolite-carbon composites in S23 may be performed at a temperature condition of 400° C. or less. The zeolite-carbon composites according to the embodiments may have thermal stability at a temperature condition of 400° C. or less. Accordingly, the zeolite-carbon composites may not be damaged during the adsorption process and the desorption process. The adsorption process and the desorption process may be repeatedly performed using the zeolite-carbon composites.

3. Evaluation of Adsorption Capacity 0.3 g of a zeolite-carbon composite or 0.3 g of a zeolite was heat-treated under vacuum conditions of 300° C. for 4 hours, to perform a degassing process. The adsorption capacity evaluation was performed at 1 bar, 25° C., and 70% relative humidity using a fixed bed continuous flow reactor. The adsorption capacity evaluation was performed using a mixed gas, and the mixed gas may include 200 ppm of isopropyl alcohol (IPA), 1000 ppm of ammonia (NH3), and helium (He). The mixed gas was supplied to the fixed bed continuous flow reactor at 100 ccm (cc/min). The adsorption capacity was evaluated by measuring a break point curve. The adsorption capacity may be evaluated by an adsorption amount. The adsorption capacity evaluation was performed on the zeolites of Comparative Example 1, Comparative Example 2, and Comparative Example 4 and the zeolite-carbon composites of Experimental Examples 1-5, Experimental Examples 1-10, Experimental Examples 1-25, Experimental Examples 1-50, Experiments 1-100, Experiments Example 2-300, Experimental Example 2-500, Experimental Example 2-700, and Experimental Example 2-900, respectively.

Figure 10A:
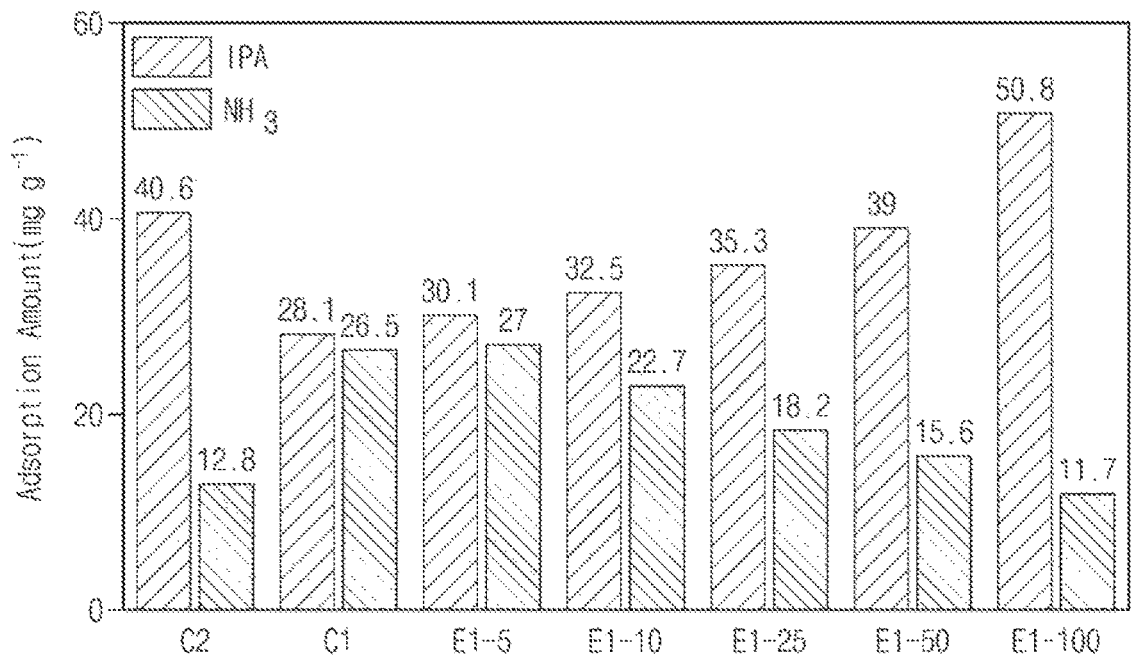
FIG. 10A illustrates results of evaluating adsorption capacity of Comparative Examples and Experimental Examples.

FIG. 10A illustrates results of evaluating adsorption capacity of Comparative Example 1, Comparative Example 2, Experimental Example 1-5, Experimental Example 1-10, Experimental Example 1-25, Experimental Example 1-50, and Experiment 1-100. In FIG. 10A, IPA means isopropyl alcohol.

Referring to FIG. 10A, Experimental Example 1-5 (E1-5), Experimental Example 1-10 (E1-10), Experimental Example 1-25 (E1-25), Experimental Example 1-50 (E1-50), and Experimental Example 1-100 (E1-100) have a greater adsorption amount of an isopropyl gas than that of Comparative Example 1 (C1). The adsorption amount of the isopropyl gas in Experimental Example 1-5 (E1-5) is 7% greater than that of Comparative Example 1 (C1). The adsorption amount of the isopropyl gas in Experimental Example 1-10 (E1-10) is 16% greater than that of Comparative Example 1 (C1). The adsorption amount of the isopropyl gas in Experimental Example 1-25 (E1-25) is 26 greater than that of Comparative Example 1 (C1), The adsorption amount of the isopropyl gas in Experimental Example 1-50 (E1-50) is 39% greater than that of Comparative Example 1 (C1). The adsorption amount of the isopropyl gas in Experimental Example 1-100 (E1-100) is 81% greater than that of Comparative Example 1 (C1). Comparative Example 1 (C1) is a zeolite without a carbon layer.

Experimental Example 1-5 (E1-5), Experimental Example 1-10 (E1-10), Experimental Example 1-25 (E1-25), Experimental Example 1-50 (E1-50), and in the experiment 1-100 (E1-100) have a larger adsorption amount of ammonia gas than that of Comparative Example 2 (C2). Experimental Example 1-5 (E1-5) has the same or similar ammonia gas adsorption capacity as/to Comparative Example 2 (C2). Comparative Example 2 (C2) is a zeolite without a carbon layer.

According to embodiments, the carbon layer may be coated on the outer surface of the zeolite by the carbonization process. Isopropyl alcohol may be hydrophobic. The zeolite-carbon composites may have high adsorption capacity for isopropyl alcohol because the carbon layer is hydrophobic. The zeolite according to embodiments may be hydrophilic. The zeolite-carbon composites may have high adsorption capacity for ammonia because an ammonia gas is hydrophilic.

Figure 10B:
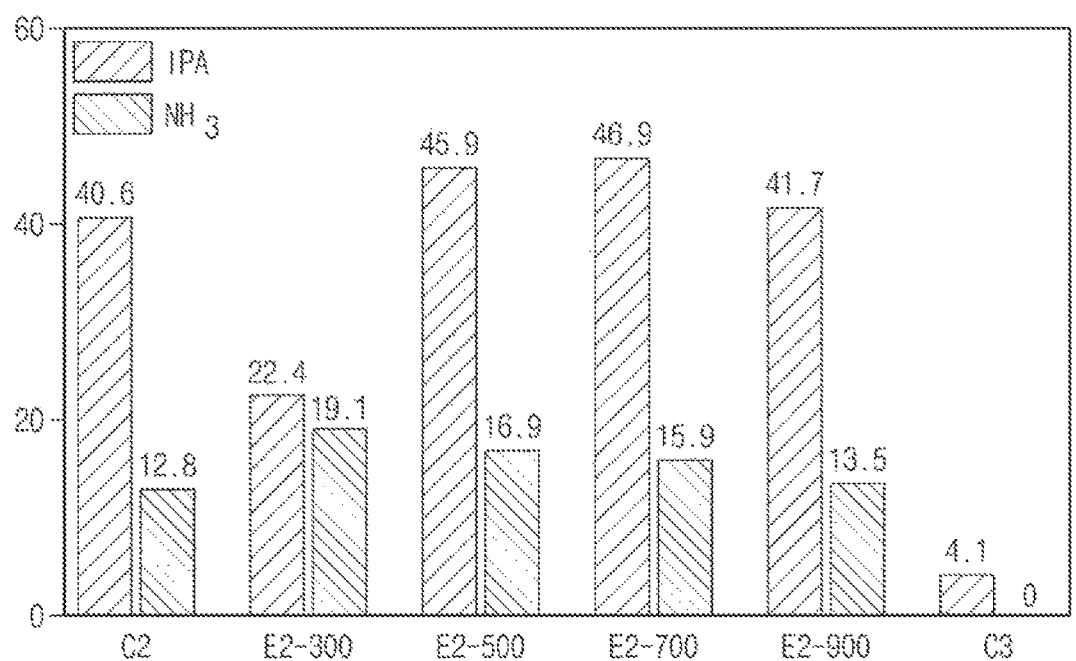
FIG. 10B shows results of evaluating adsorption capacity of Comparative Examples and Experimental Examples.

FIG. 10B is results of evaluating adsorption capacity of Comparative Example 2, Comparative Example 3, Experimental Example 2-300, Experimental Example 2-500, Experimental Example 2-700, and Experimental Example 2-900. In FIG. 10B, IPA means isopropyl alcohol.

Referring to FIG. 10B, Comparative Example 3 (C3) may be prepared by performing a carbonization process at a temperature of 1100° C. The zeolite-carbon composites of Experimental Example 2-300 (E2-300), Experimental Example 2-500 (E2-500), Experimental Example 2-700 (E2-700), and Experimental Example 2-900 (E2-900) may be formed by performing carbonization processes at 300° C., 500° C., 700° C., and 900° C., respectively. Experimental Example 2-300 (E2-300), Experimental Example 2-500 (E2-500), Experimental Example 2-700 (E2-700), and Experimental Example 2-900 (E2-900) have a greater adsorption amount of isopropyl gas than that of Comparative Example 3 (C3).

Experimental Example 2-300 (E2-300), Experimental Example 2-500 (E2-500), Experimental Example 2-700 (E2-700), and Experimental Example 2-900 (E2-900) have an adsorption amount of an ammonia gas greater than that of Comparative Example 3 (C3).

Comparative Example 2 (C2) includes zeolite, but does not include a carbon layer. Each of Experimental Example 2-300 (E2-300), Experimental Example 2-500 (E2-500), Experimental Example 2-700 (E2-700), and Experimental Example 2-900 (E2-900) may have a zeolite and a carbon layer. Experimental Example 2-500 (E2-500), Experimental Example 2-700 (E2-700), and Experimental Example 2-900 (E2-900) have a higher isopropyl gas adsorption amount than that of Comparative Example 2 (C2). The adsorption amount of isopropyl gas of Experimental Example 2-500 (E2-500) is 13% greater than the adsorption amount of isopropyl gas of Comparative Example 2 (C2). The adsorption amount of isopropyl gas of Experimental Example 2-700 (E2-700) is 16 greater than the adsorption amount of isopropyl gas of Comparative Example 2 (C2). The adsorption amount of isopropyl gas of Experimental Example 2-900 (E2-900) is 3% greater than the adsorption amount of isopropyl gas of Comparative Example 2 (C2).

Experimental Example 2-300 (E2-300), Experimental Example 2-500 (E2-500), Experimental Example 2-700 (E2-700), and Experimental Example 2-900 (E2-900) have a higher adsorption amount of ammonia gas than Comparative Example 2 (C2). The ammonia gas adsorption amount of Experimental Example 2-300 (E2-300) is 49% greater than the ammonia gas adsorption amount of Comparative Example 2 (C2). The ammonia gas adsorption amount of Experimental Example 2-500 (E2-500) is 32% greater than the ammonia gas adsorption amount of Comparative Example 2 (C2). The ammonia gas adsorption amount of Experimental Example 2-700 (E2-700) is 24% greater than the ammonia gas adsorption amount of Comparative Example 2 (C2). The adsorption amount of ammonia gas of Experimental Example 2-900 (E2-900) is 5% greater than the adsorption amount of ammonia gas of Comparative Example 2 (C2).

According to the inventive concept, the zeolite-carbon composite may have the high adsorption capacity for the organic gas and the high adsorption capacity for the alkali gas. Using the zeolite-carbon composite, the organic gas and the alkali gas may be adsorbed by a single process. The desorption process of the organic gas and the alkali gas may be performed as a single process. Accordingly, the process of treating the exhaust gas may be simplified, and the exhaust gas treatment process yield may be improved.

While embodiments are described above, a person skilled in the art may understand that many modifications and variations are made without departing from the spirit and scope of the inventive concept defined in the following claims. Accordingly, the example embodiments of the inventive concept should be considered in all respects as illustrative and not restrictive, with the spirit and scope of the inventive concept being indicated by the appended claims.

What is claimed is:

1. A method of treating an exhaust gas, the method comprising:
   providing a mixed gas including an organic gas and an alkali gas in a rotor provided with a zeolite-carbon composite therein;
   adsorbing the organic gas and the alkali gas to the zeolite-carbon composite; and
   desorbing the organic gas and the alkali gas from the zeolite-carbon composite,
   wherein the zeolite-carbon composite includes: a zeolite and a carbon layer on the zeolite.

2. The method of claim 1, wherein the carbon layer is hydrophobic, and
   wherein the alkali gas is hydrophilic, and the organic gas is hydrophobic.

3. The method of claim 1, wherein the rotor has a first region and a second region,
   wherein the adsorbing of the organic gas and the alkali gas is performed in the first region of the rotor, and
   wherein the desorbing of the organic gas and the alkali gas is performed in the second region of the rotor.

4. The method of claim 3, wherein the second region of the rotor is provided at a temperature that is higher than a temperature of the first region of the rotor.

5. The method of claim 1, further comprising:
   transferring the desorbed organic gas and the desorbed alkali gas to a combustion facility; and
   combusting the organic gas and the alkali gas in the combustion facility.

6. The method of claim 1, wherein the providing of the mixed gas comprises:
   supplying a first gas through a first duct; and
   supplying a second gas through a second duct,
   wherein the first gas comprises the organic gas, and
   wherein the second gas comprises the alkali gas.

7. The method of claim 6, wherein at least one of the first gas and the second gas further comprises water vapor.

8. The method of claim 6, wherein the second gas further comprises the organic gas.

9. A method of treating an exhaust gas, the method comprising:
   providing a mixed gas including a hydrophobic gas and a hydrophilic gas in a rotor provided with a zeolite-carbon composite therein;
   adsorbing the hydrophobic gas and the hydrophilic gas to the zeolite-carbon composite under a first temperature;
   desorbing the hydrophobic gas and the hydrophilic gas from the zeolite-carbon composite under a second temperature; and
   combusting the desorbed hydrophobic gas and the desorbed hydrophilic gas, wherein the second temperature is higher than the first temperature, wherein the zeolite-carbon composite includes: a zeolite and a carbon layer on an outer surface of the zeolite.

10. The method of claim 9, wherein the rotor has a first region and a second region, wherein the adsorbing of the organic gas and the alkali gas is performed in the first region of the rotor, and wherein the desorbing of the organic gas and the alkali gas is performed in the second region of the rotor.

11. The method of claim 10, wherein the combusting of the hydrophobic gas and the hydrophilic gas is performed in a combustion facility, and wherein the second region of the rotor is provided between the first region of the rotor and the combustion facility.

12. The method of claim 10, wherein the providing of the mixed gas comprises:

supplying the hydrophobic gas to a mixing chamber through a first duct;

supplying the hydrophilic gas to the mixing chamber through a second duct, the mixed gas being formed in the mixing chamber; and transferring the mixed gas from the mixing chamber into the rotor, wherein the first region of the rotor is provided between the mixing chamber and the second region of the rotor.

13. The method of claim 9, wherein the zeolite has a pore therein, wherein the carbon layer does not block the pore of the zeolite, and wherein the pore of the zeolite is connected to an external space.

14. The method of claim 9, wherein the hydrophobic gas comprises isopropyl alcohol, and wherein the hydrophilic gas comprises ammonia.

* * * * *